United States Patent
Fisher et al.

(10) Patent No.: US 12,515,499 B2
(45) Date of Patent: Jan. 6, 2026

(54) OVERHEAD CLIMATE CONTROL UNIT FOR DELIVERY VEHICLE

(71) Applicant: The Shyft Group, Inc., Charlotte, MI (US)

(72) Inventors: Eric R. Fisher, Elkhart, IN (US); Robert Tigner, Dalworthington Gardens, TX (US)

(*) Notice: Subject to any disclaimer, the term of this patent is extended or adjusted under 35 U.S.C. 154(b) by 119 days.

(21) Appl. No.: 18/171,854

(22) Filed: Feb. 21, 2023

(65) Prior Publication Data

US 2023/0264539 A1 Aug. 24, 2023

Related U.S. Application Data

(60) Provisional application No. 63/317,389, filed on Mar. 7, 2022, provisional application No. 63/313,305, filed on Feb. 24, 2022.

(51) Int. Cl.
*B60H 1/32* (2006.01)
*B60P 3/20* (2006.01)

(52) U.S. Cl.
CPC ......... *B60H 1/3205* (2013.01); *B60H 1/3229* (2013.01); *B60P 3/20* (2013.01); *B60H 2001/3277* (2013.01); *B60H 2001/3279* (2013.01)

(58) Field of Classification Search
CPC ........ B60H 2001/3277; B60H 2001/79; B60H 1/00507; B60H 1/00514; B60H 1/00521
See application file for complete search history.

(56) References Cited

U.S. PATENT DOCUMENTS

| 3,449,924 | A | * | 6/1969 | Sudmeier | F04B 39/1073 |
| | | | | | 417/571 |
| 3,494,413 | A | * | 2/1970 | Dixon | B60H 1/3227 |
| | | | | | 165/43 |
| 3,983,715 | A | * | 10/1976 | Hair, Jr. | B60K 25/00 |
| | | | | | 62/243 |
| 2012/0175081 | A1 | * | 7/2012 | Katoh | F28D 1/05366 |
| | | | | | 165/104.14 |
| 2023/0191871 | A1 | * | 6/2023 | Feltham | B60N 2/5678 |
| | | | | | 701/36 |

FOREIGN PATENT DOCUMENTS

KR 2304635 B1 * 9/2021

* cited by examiner

*Primary Examiner* — Jianying C Atkisson
*Assistant Examiner* — Meraj A Shaikh
(74) *Attorney, Agent, or Firm* — Barnes & Thornburg LLP

(57) ABSTRACT

An air distribution system for use in a cargo delivery vehicle. The air distribution system includes a compressor, a condenser, a plurality of tubes, an air distribution unit, and a mounting system for mounting the air distribution unit to the roof of the cargo delivery vehicle. The air distribution unit includes a unit body, a vent hood, and a vent plate. The unit body includes a fan and a plurality of tubes. The vent plate includes at least one vent opening.

10 Claims, 5 Drawing Sheets

OVERHEAD CLIMATE CONTROL UNIT FOR DELIVERY VEHICLE

RELATED APPLICATIONS

This application claims the benefit of U.S. Provisional Application Ser. No. 63/317,389 filed Mar. 7, 2022 for an "Overhead Air Conditioning Unit for Delivery Vehicles" and U.S. Provisional Application Ser. No. 63/313,305 filed Feb. 24, 2022 for an "Overhead Air Conditioning Unit for Delivery Vehicles," both of which are hereby incorporated by reference in their entireties.

TECHNICAL FIELD

The present application relates generally to air distribution in vehicles and, more particularly, to an improved system, method, and apparatus for a climate control unit designed for implementation in cargo delivery vehicles.

BACKGROUND

Almost every automotive vehicle includes a heating, ventilation, and air condition (HVAC) system for improving the environment and comfort of occupants inside the vehicle. The distribution of the air flow or ventilation inside the vehicle is typically manipulated by extensive duct work and multiple doors and other devices for redirecting the air flow according to the desires of the vehicle occupants. Generally, air flow is directed toward the vehicle occupants from a portion of the vehicle dashboard. Although these prior art designs are workable, they are not very efficient or effective when implemented in delivery vehicles, or other similar large cargo vehicles.

Therefore, there is a need to overcome one or more of these difficulties.

SUMMARY

This disclosure, in at least one aspect, provides a cargo delivery vehicle with a forward cab area having a driver's seat and a rear cargo storage area adjacent the forward cab area. The vehicle includes a climate control unit configured to distribute conditioned air within the forward cab area. The climate control unit includes at least one fan mounted directly above the driver's seat that is configured to direct conditioned air towards the driver's seat from the fan.

In another aspect, this disclosure provides a system for air distribution in a cargo delivery vehicle. The system includes a compressor, a condenser, a first plurality of tubes, and an air distribution unit. In some embodiments, the air distribution unit includes a body with a fan and a second plurality of tubes, a vent hood, and a vent plate. In some cases, the vent hood includes at least one vent opening and a mounting system for mounting the air distribution unit to a roof of the cargo delivery vehicle.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
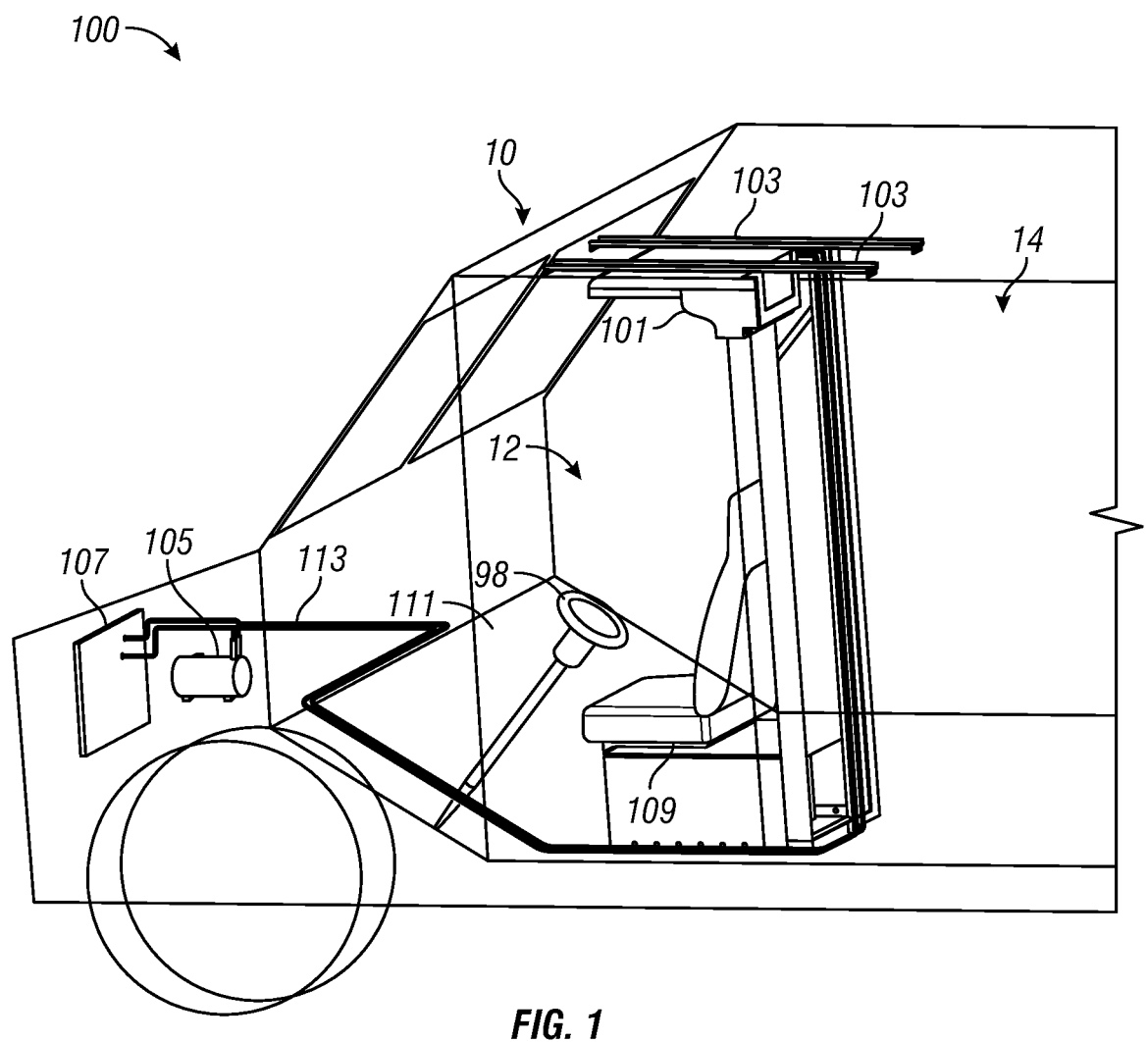
FIG. 1 is a perspective view of a cargo delivery vehicle with an air distribution system according to an embodiment of this disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure solves multiple technical problems. One difficulty is keeping the driver of a cargo delivery vehicle cooled or heated during their delivery/pickup route. Regulating the temperature within the cab of a cargo delivery vehicle presents unique difficulties compared to other types of vehicles. Since delivery drivers make numerous delivery/pickup stops, the vehicle's cab doors are opening and closing at each stop. Each time the driver opens the cab doors at a stop, this causes air from outside the vehicle to enter the cab area. Consider an example in which it is a hot summer day. When a delivery driver makes a stop to drop off a package, the cab door is opened to make the delivery.

When the door is open, the hot summer air enters the cab and increases the temperature within the cab. This makes it difficult to keep the driver cool through the typical dash-mounted vents when the cab doors are opening at each stop.

Referring now to FIG. 1, an embodiment of a system, apparatus, and method for distributing air flow in a cargo delivery vehicle is disclosed. One or more embodiments of the present disclosure are particularly well suited for efficiently and reliably distributing climate controlled air, such as cooled or heated air, within a cargo delivery vehicle 10. Typically, the forward cab portion 12 and the rearward cargo area 14 are separated by a bulkhead door (not shown) so the driver can move about the vehicle 10 between the rearward cargo area 14 and the forward cab portion 12 without needing to exit the vehicle 10. For example, the cargo delivery vehicle 10 includes a forward cab portion 12 with a driver's seat 109 and a rearward cargo area 14 in which cargo is stored for pickup and/or delivery by the cargo delivery vehicle 10. When delivering a package, the driver can park the vehicle 10, and enter the rear cargo area 14 through the bulkhead door to get the package without needing to exit the vehicle 10.

It should be appreciated that other forms of cooled, ventilated or heated air distribution may be used in similar embodiments. Additionally, it should be appreciated that the air distribution system disclosed herein could be used in vehicles that do not deliver cargo, but are designed in similar configurations to conventional cargo delivery vehicles. Furthermore, it will be appreciated that the methods and apparatuses of the present disclosure any be used with gas-powered vehicles, diesel-powered vehicles, electric vehicles, and hybrid vehicles.

In the embodiment shown, air distribution system 100 includes an air conditioning unit 101, a compressor 105, a condenser 107, and tubing 113. Under one or more embodiments, air conditioning unit 101 may be coupled to the inside of the roof of the vehicle's forward cab portion 12 using rails 103. However, it should be appreciated that in some embodiments, other mounting or attachment methods to secure the air conditioning unit 101 in position overhead the driver's seat 109. Tubing 113 is used to direct gases and refrigerant to and from the air conditioning unit 101. It should be appreciated that the configuration of tubing 113 is illustrative and may vary, depending on the layout of the vehicle, such that tubing 113 is generally not visible on the interior of the vehicle when installation of the unit in a vehicle is complete.

In some embodiments, the condenser 107 is mounted in an engine compartment in front of a radiator on the vehicle. However, it should be appreciated that various mounting locations and methods may be used in other embodiments, which will be described in further detail herein.

In one embodiment, air conditioning unit 101 is controlled via controls on the instrument panel of the vehicle dashboard. The general area of the vehicle dashboard is represented by dashboard area 111. The control type could vary, such as push buttons, dials, or any other method of controlling a device on a vehicle dashboard. It should be appreciated, however, that other methods of control may exist. For example, the controls could be on the overhead air conditioning unit itself, or controls could be placed on the steering wheel 98. While those are several examples of air conditioning control locations, it should be understood that the overhead air distribution unit could be controlled in numerous ways that other common vehicle control panels are controlled.

Air distribution system 100 further includes seat 109. Seat 109 is configured to be a driver's seat of a cargo delivery vehicle in this embodiment. However, it should be appreciated that a second seat on the passenger side may be included in some vehicles as well. In one embodiment, the air conditioning unit 101 is located directly above seat 109, so as to allow for air flow directly on to the driver of the cargo delivery vehicle from above. If a second seat were to be included in the vehicle, as discussed above, a second air conditioning unit 101 could be placed directly above the passenger seat. It should be understood that the essential purpose of the air conditioning unit is to provide air flow directly above a seat, whether that be the driver's seat, passenger seat, or multiple seats in a vehicle with more than one seat.

In the embodiment illustrated in FIG. 1, hot gas passes from compressor 105 through tubing 113 as discharge to condenser 107. Refrigerant is then cooled to a liquid state in condenser 107 and leaves the condenser 107 as a high pressure liquid. The liquid refrigerant then follows tubing 113 where it expands into a low pressure gas. This arrangement is merely provided as an example, and it should be appreciated that other methods of air distribution may be used, while keeping the main functionality of this arrangement.

Figure 2:
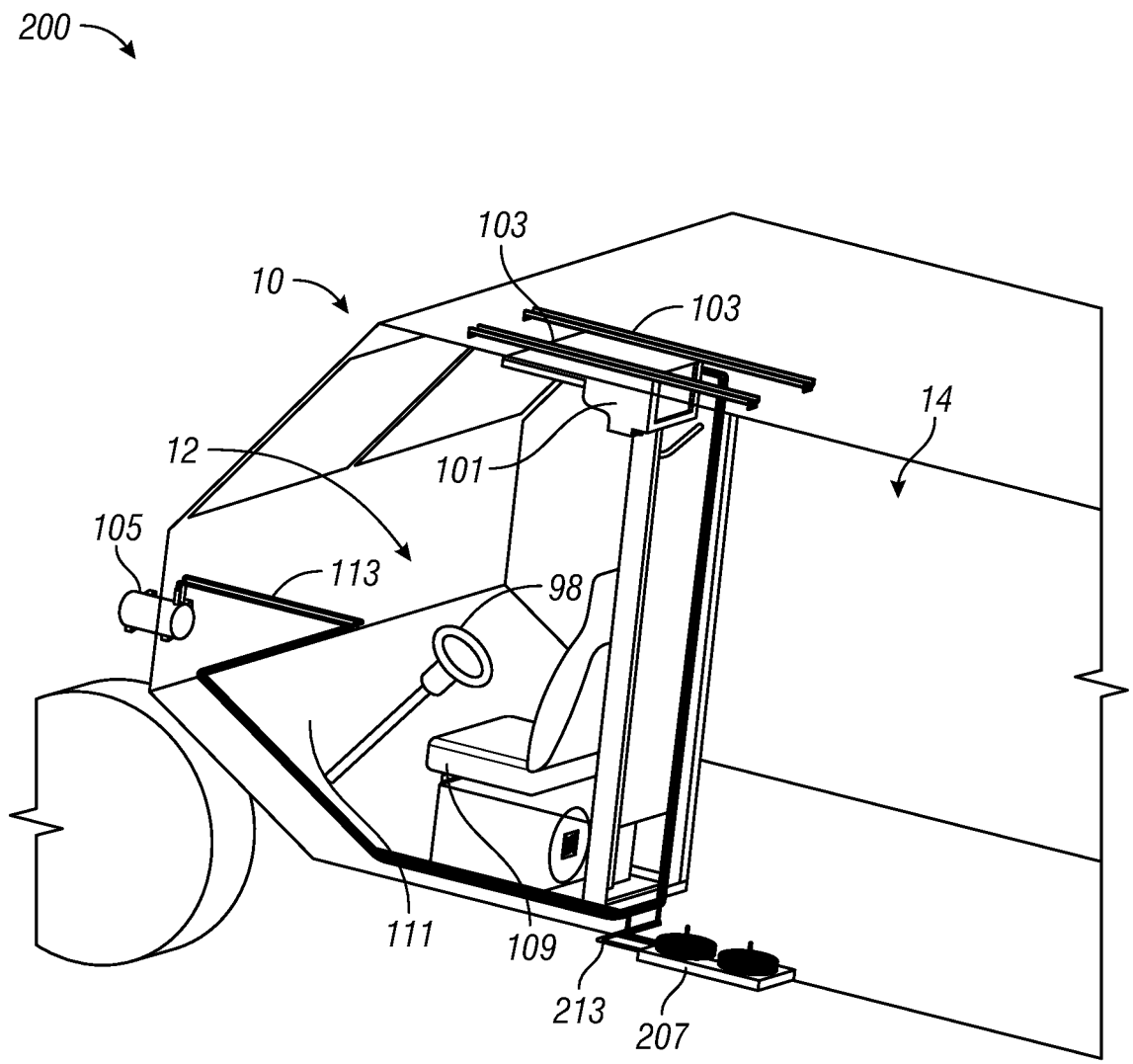
FIG. 2 is a perspective view of a cargo delivery vehicle with an air distribution system according to an another embodiment of this disclosure.

Referring now also to FIG. 2 in the drawings, another embodiment of this disclosure is illustrated. This embodiment of the air distribution system for use in cargo delivery vehicles includes air conditioning unit 101, rails 103, compressor 105, and condenser 107, similar to the earlier described embodiment. However, in this embodiment the condenser is located in the floor of the vehicle, rather than being located in front of the radiator on the front end of the vehicle.

In the embodiment illustrated in FIG. 2, hot gas passes from compressor 105 through tubing 113 as discharge to condenser 207. Refrigerant is then cooled to a liquid state in condenser 207 and leaves the condenser 207 as a high pressure liquid. The liquid refrigerant then follows tubing 113 where it expands into a low pressure gas. The low pressure gas can then be returned to compressor 105 via a suction line, which is included in tubing 113. Additional tubing 213 is illustrated as a differentiation in the tubing necessary for this embodiment, as opposed to the embodiment illustrated in FIG. 1. While the parts of this embodiment vary in position as compared to the embodiment of FIG. 1, it is important to note that the air distribution system maintains functionality as an overhead air distribution system.

Figure 3:
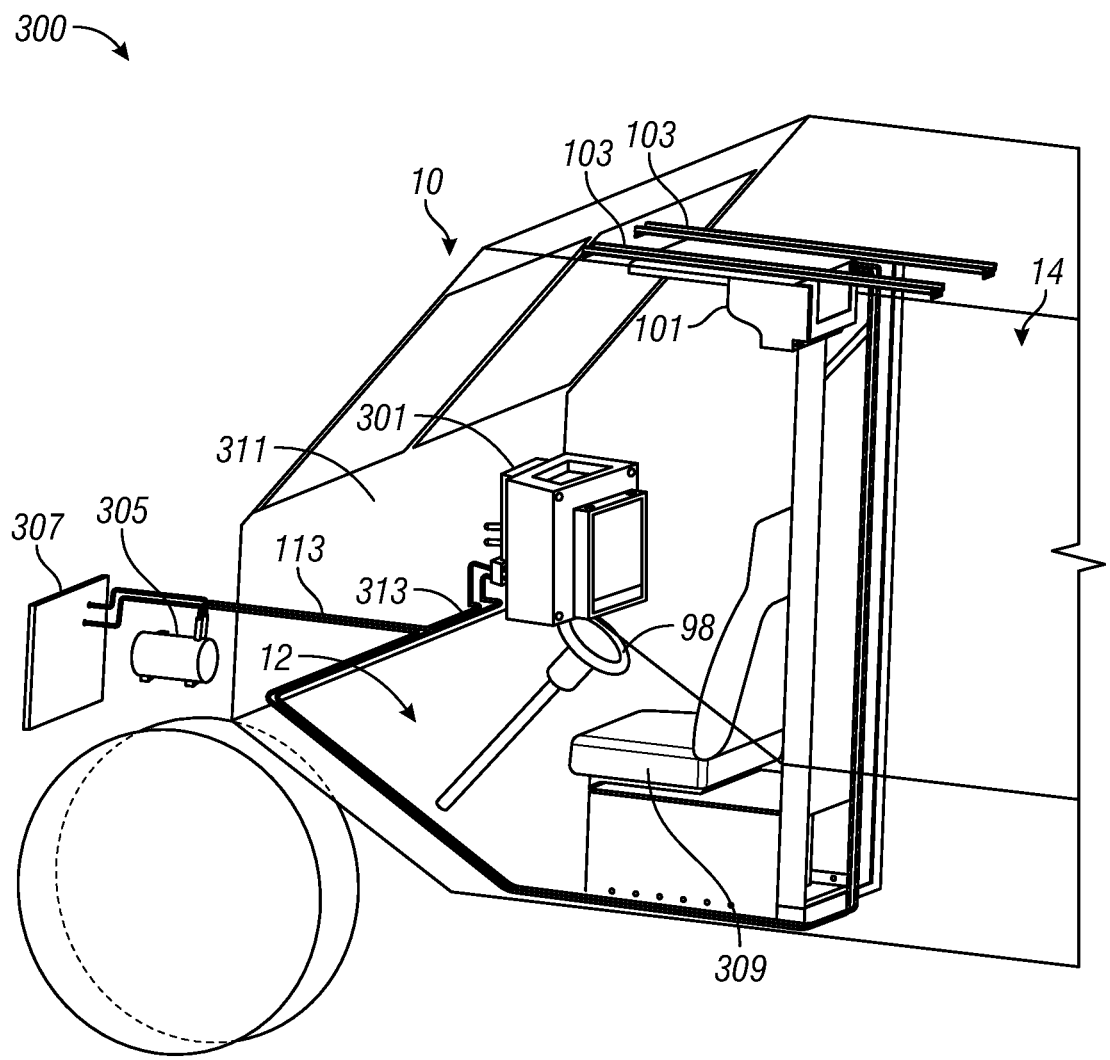
FIG. 3 is a perspective view of a cargo delivery vehicle with an air distribution system according to an another embodiment of this disclosure.

Referring now also to FIG. 3 in the drawings, another embodiment of the present disclosure is illustrated. Air distribution system 300 includes air conditioning unit 101, rails 103, and tubing 113, similar to system 100. However, air distribution system 300 is designed to be integrated with another air distribution unit 301. Air distribution unit 301 may be an already existing unit within a cargo delivery vehicle 10 or unit 301 could be an additional unit being added at the same time as air conditioning unit 101.

System 300 further includes compressor 305, condenser 307, seat 309, dashboard area 311, and tubing 313. Tubing 313 is attached to both air distribution unit 301 and tubing 113, so as to allow operation of both air distribution unit 301 and air conditioning unit 101 in one complete system 300.

While FIG. 3 illustrates air distribution unit 301 positioned in the dashboard area 311 of the cargo delivery vehicle, it should be appreciated that the present disclosure may have the air distribution unit positioned in other areas of the vehicle 10.

In the embodiment illustrated in FIG. 3, hot gas passes from compressor 305 through tubing 113 as discharge to condenser 307. Refrigerant is then cooled to a liquid state in condenser 307 and leaves the condenser 307 as a high pressure liquid. The liquid refrigerant then follows both tubing 113, where it expands into a low pressure gas, and tubing 313, where the refrigerant is delivered to air distribution unit 301. Low pressure gas is then returned from air conditioning unit 101 and air distribution unit 301 to the compressor 305 via suction lines, which are part of tubing 113 and tubing 313.

Figure 4:
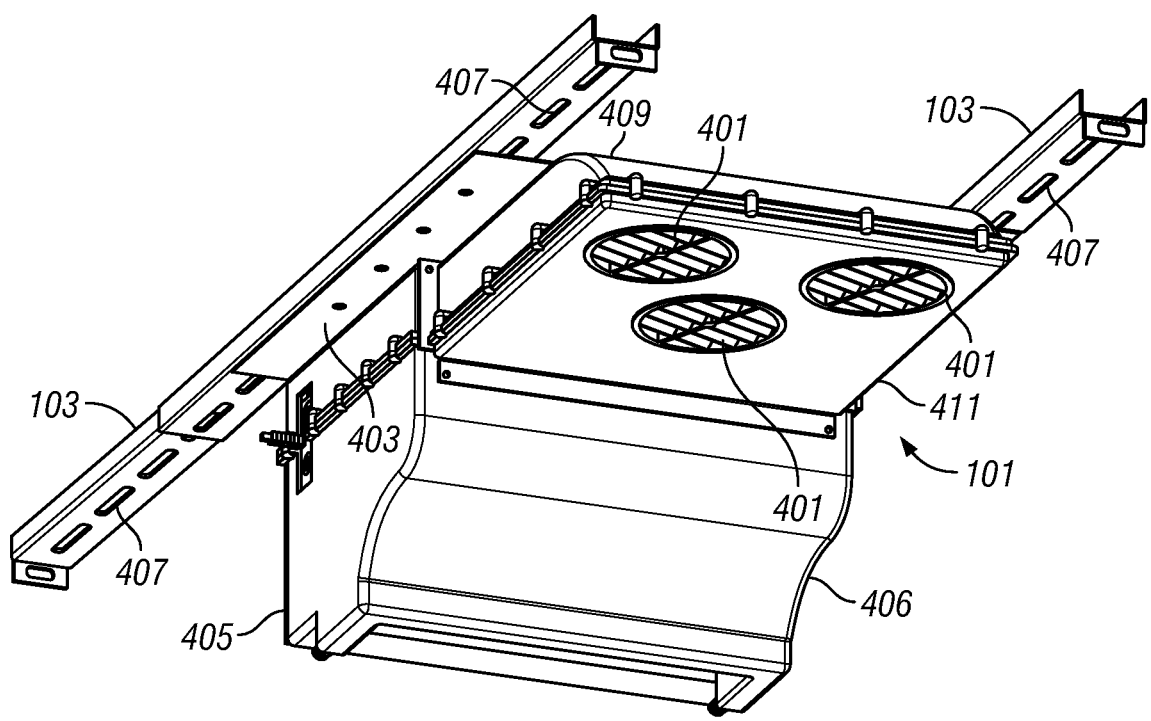
FIG. 4 is a perspective view of an example air conditioning unit that may be included in the air distribution system of FIG. 1.

Referring now also to FIG. 4 in the drawings, an air conditioning unit and mounting rails are illustrated. Air conditioning unit 101 from the above embodiments of the present invention is illustrated in more detail to show certain features of the present invention. Also illustrated in FIG. 4 with expanded detail is the rails 103, which are used to mount the air conditioning unit 101 to the cargo delivery vehicle.

In some embodiments, rails 103 include a plurality of apertures 407. As shown in FIG. 4, apertures 407 are generally rectangular in shape, but with the two ends being rounded. However, it should be appreciated that apertures 407 may have a variety of shapes depending on the desired mounting method. For example, circles, ovals, or other shapes may be used in combination with one another to meet the desired function.

In some embodiments, air conditioning unit 101 is mounted to rails 103 using a mounting plate 403. Mounting plate 403 includes multiple apertures to allow for fasteners to pass through from the air conditioning unit 101 to the rails 103. It should be appreciated that other methods of mounting/fastening may not require the mounting plate 403 to be a separate structure, and that the mounting methods may be integrated into either the rails 103 or the air conditioning unit 101. Rails 103 may be integrated into the roof of the vehicle, such that they are a part of the main vehicle structure, or the rails 103 can be added to an already existing vehicle frame. It should be appreciated that different embodiments may leave the rails exposed, while other embodiments cover the rails such that they are not visible once the whole system is mounted and installed.

Air conditioning unit 101 includes unit body 405, curved edge 406, vent hood 409, vent plate 411, and vent openings 401. Further portions of air conditioning unit 101 are best illustrated in FIG. 5.

Figure 5:
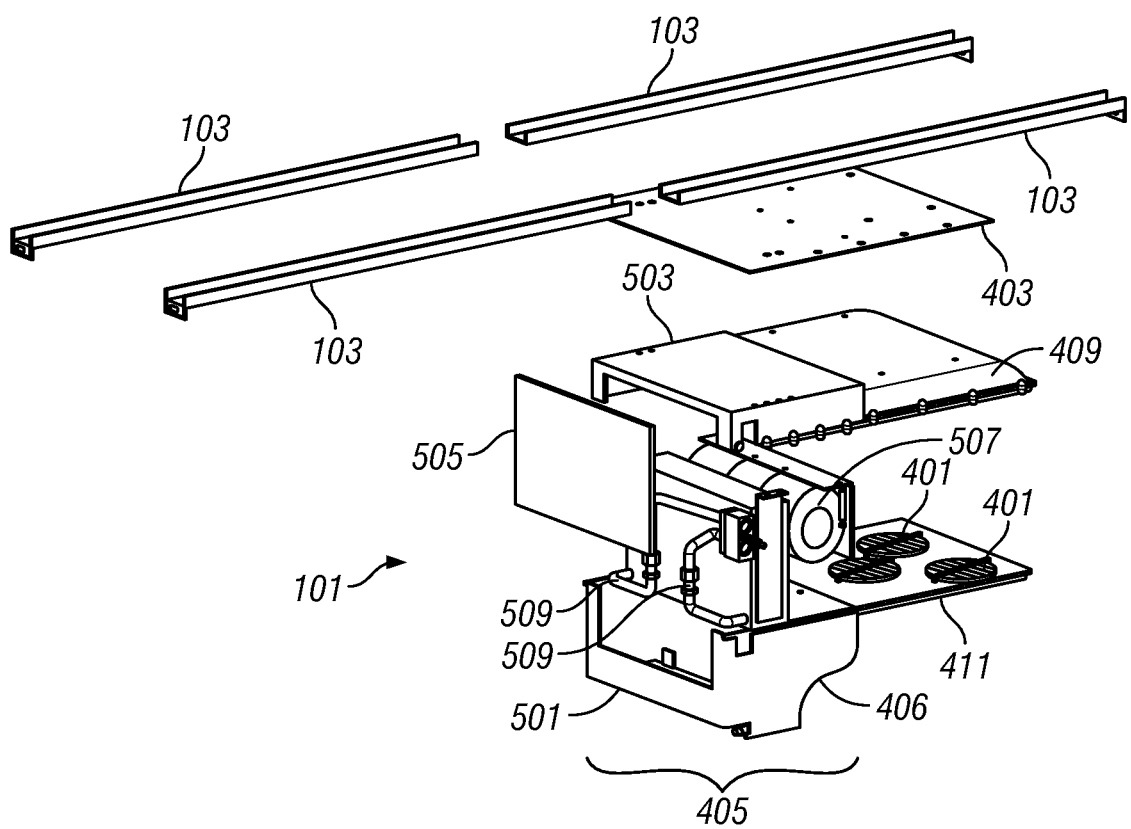
FIG. 5 is an exploded view of the example air conditioning unit shown in FIG. 4.

Referring now also to FIG. 5 in the drawings, an exploded view of the air conditioning unit and mounting rails is illustrated. FIG. 5 best illustrates that unit body 405 includes bottom portion 501, top portion 503, and air filter 505. Fan 507 and tubing 509 are typically housed within unit body 405. It should be appreciated that additional components not illustrated here may be housed within the unit body 405, if desired. For example, if the air conditioning unit contained controls directly on the unit, the components required for control operation may be housed within the unit body. Curved edge 406 is the front edge of the unit body, designed to aid airflow downwards towards occupant of the vehicle. It should be appreciated that various curve designs, or even planar designs, may be used on the front edge of the unit body 405 to best implement the desired result of the present invention.

In some embodiments, air filter 505 may be removed without deconstructing other portions of the air conditioning unit 101, so as to provide access to the internal portion of unit body 405 for purposes such as part repair. However, the removal of the air filter while the rest of the unit remains constructed is not a requirement and may have variations within alternative embodiments of the present disclosure. Additionally, it should be appreciated that air filter 505 is optional, and not a requirement for functionality of the present invention. If air filter 505 is not present, other embodiments may vary in structure, so as to replace the space left by the air filter not being present. For example, the space where air filter 505 is illustrated in FIG. 5 could be taken up by a rear plate, the top portion 503 and bottom portion 501 could be reconfigured to enclose this area, or a gap may be left with no filler. These examples are merely illustrative and it should be appreciated that the functionality of the present invention can remain unchanged with a variety of structures occupying the area of the air filter 505.

In some embodiments, tubing 509 is designed to carry both liquids and gases, which allow for the operation of the air conditioning unit. In an embodiment, the cooled air from the tubing 509 is distributed from the unit body via fan 507. When air is directed from fan 507, the air travels into vent hood 409. In some embodiments, vent hood 409 is designed to cause the cooled air from the fan 507 to be directed towards vent plate 411, which has vent openings 401. Air passes through vent openings 401 to be moved in the desired direction. While vent openings 401 are illustrated as circular openings with interior slotted openings, it should be appreciated that the vent openings may take on a variety of shapes to achieve a desired outcome. For example, the vent openings could be rectangle, oval, or square shaped, and the vent openings may have the slotted openings as illustrated, or no slots and just a hole as the opening. The number and size of the vent openings may also vary, depending on the desired air flow.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

The invention claimed is:

1. A cargo delivery vehicle comprising:
   an engine compartment;
   a forward cab area with a driver's seat, wherein the forward cab area includes a flat roof that extends entirely along a horizontally-extending plane;
   a rear cargo storage area adjacent the forward cab area;
   an air distribution system fully beneath the horizontally-extending plane configured to distribute conditioned air within the forward cab area, wherein the air distribution system comprises a compressor mounted within the engine compartment, a condenser, an air conditioner, and tubing fluidly connecting the compressor, the condenser, and the air conditioner;
   a mounting structure in the forward cab area comprising one or more rails mounted to the interior of the roof, wherein the air conditioner is coupled with the one or more rails;

wherein the air conditioner includes at least one fan mounted directly above the driver's seat that is configured to direct cooled air towards the driver's seat from the at least one fan; and wherein the tubing extends between the interior of the forward cab area and the engine compartment.

2. The cargo delivery vehicle of claim 1, wherein the compressor is configured to circulate a refrigerant through the tubing between the condenser and the air conditioner.

3. The cargo delivery vehicle of claim 2, wherein the tubing is mounted within the forward cab area in areas hidden from view.

4. The cargo delivery vehicle of claim 3, wherein the condenser is mounted in the engine compartment in front of the forward cab area.

5. The cargo delivery vehicle of claim 3, wherein the condenser is mounted in a floor of the forward cab area and/or a floor of the rear cargo storage area.

6. The cargo delivery vehicle of claim 1, further comprising a heater unit configured to distribute heated air from the at least one fan.

7. The cargo delivery vehicle of claim 1, wherein the air distribution system includes one or more controls configured to adjust a speed of the fan, wherein the one or more controls are positioned on: (i) a dashboard in the forward cab area and/or (ii) a steering wheel in the forward cab area.

8. A system for air distribution in a cargo delivery vehicle having an engine compartment, a forward cab area including a flat roof that extends entirely along a horizontally-extending plane and a driver's seat, and a rear cargo storage area adjacent the forward cab area, the system comprising:
   a compressor mountable in the engine compartment;
   a condenser mountable in the engine compartment, a floor of the forward cab area and/or a floor of the rear cargo storage area;
   a first plurality of tubes;
   an air conditioner comprising:
      a unit body, comprising:
         a fan; and
         a second plurality of tubes fluidly connecting the air conditioner to the compressor and/or the condenser;
      a vent hood;
      a vent plate, comprising:
         at least one vent opening; and
   a mounting structure comprising:
      a set of rails having a first plurality of apertures; and
      a mounting plate having a second plurality of apertures, wherein the first plurality of apertures and the second plurality of apertures are configured such that a fastener can be used to mount the air conditioner to the set of rails; and
   wherein the set of rails extend beneath the roof and the air conditioner is coupled with the set of rails.

9. The system of claim 8, the unit body further comprising:
   a bottom portion;
   a top portion; and
   a rear portion;
   wherein the fan and the second plurality of tubes are at least substantially enclosed by the bottom portion, the top portion, and the rear portion.

10. The system of claim 9, the bottom portion further comprising a curved front edge.

* * * * *